United States Patent Office 2,892,755
Patented June 30, 1959

2,892,755
PROCESS FOR PREPARING A SEROLOGICALLY ACTIVE FRACTION OF VIRULENT TREPONEMA PALLIDUM AND RESULTING PRODUCT

Joseph Portnoy, Chapel Hill, N.C., assignor to the United States of America as represented by the Secretary of the Army No Drawing. Application September 12, 1956
Serial No. 610,046

5 Claims. (Cl. 167—84.5)

(Granted under Title 35, U.S. Code (1952), sec. 266)

The invention described herein may be manufactured and used by or for the Government for governmental purposes without the payment of any royalty thereon.

The present invention provides an improved process for preparing a serologically active fraction of virulent Treponema pallidum, the causative agent of syphilis, it being found that the chemical fraction obtained by the process has unique serologic properties. When employed in a simple complement fixation test, this chemical fraction appears to detect a new type of antibody present in syphilitic disease, and whereas other serologic procedures which have used whole virulent Treponema pallidum are extremely difficult to perform, thus limiting their usefulness, the chemical fraction obtained by the process of the present invention is used in a simple, easy to perform complement fixation test. The high order of specificity and sensitivity attained by use of this chemical fraction in a complement fixation test and the simplicity of the test suggests a high utility in the serodiagnosis of syphilis in the differentiation of biologic false positive reactions.

The demonstration of immobilizing antibodies against virulent Treponema pallidum by Nelson and Mayer (R. A. Nelson and M. D. Mayer, Journal of Experimental Medicine 89: 369, 1949) has not only provided a tool of immunologic and diagnostic significance, but has stimulated the search for other treponemal antigens. This search has been motivated by two major problems: first, the technical limitations inherent in the Treponema pallidum immobilization test (TPI test) have limited its use to relatively few serologic laboratories, so that there is need for a test of comparable specificity which can be used by the average serologic laboratory; second, there is need for further understanding of the antigen-antibody reactions involved, particularly since recent studies indicate that a multiplicity of such reactions may be measured.

With the exception of the work of Saurino and De Lamater (V. R. Saurino and E. D. De Lamater, Am. J. Syph. Gonor. and Ven. Dis., 36: 353 (1952)), all of the recent reports of treponemal antigens have employed whole organisms as antigens, e.g. Treponema pallidum immobilization test, Treponema pallidum agglutination tests, Treponema pallidum immune-adherence test. Saurino and De Lamater prepared extracts of virulent Treponema pallidum using hydrochloric acid and obtained an antigen which, used in a precipitin test, gave negative reactions with eight normal human sera, and positive reactions with fourteen human cases of secondary syphilis.

The present invention provides a method by which a serologically reactive antigen has been prepared from virulent Treponema pallidum through the preliminary extraction and discarding of lipid fractions and extraction of the active principle by a solution containing sodium desoxycholate, sodium citrate, and sodium chloride. The resulting antigen can be used in a complement fixation test to demonstrate what appears to be a new antibody, the characteristics of the antigen being such as to indicate the feasibility of large scale production and distribution.

I. MATERIALS AND METHODS

A. *Preparation of antigen from virulent T. pallidum*

(1) Sodium citrate (0.075 M, reagent grade): Dissolve in distilled water and sterilize by autoclaving at 15 lbs. pressure for 30 minutes. Chill to cold room temperature before use.

(2) Sodium chloride (0.85%, reagent grade): Dissolve in distilled water. Sterilize and chill as described for sodium citrate.

(3) Desoxycholate extracting solution: This solution contains sodium desoxycholate, 0.2%, sodium citrate, 0.1 M, and sodium chloride, 0.1 M. Dissolve reagents in distilled water. Heat to boiling and then boil over flame for two minutes. Transfer to a sterile glass-stoppered flask and store at room temperature. The pH of this solution (glass electrode) is substantially 7.4 to 7.5.

(4) Acetone (reagent grade): Redistill and store in the cold.

(5) Anhydrous ether (reagent grade): Store in the cold.

In carrying out the procedure, rabbits are infected intratesticularly with an inoculum containing on the average $1.3 \times 10^8$ virulent *T. pallidum*. (In the few instances when cortisone was used, rabbits were injected intramuscularly with 12 mg. of cortone acetate, Merck & Co., daily, beginning with the day of inoculation with treponemes.) When a firm orchitis develops, usually in 10–12 days, the animals are sacrificed by air embolism. The testes are removed aseptically, placed in petri dishes, and immediately stored in the cold room. The testes then are sliced, using a conventional egg slicer, and placed in sterile Erlenmeyer flasks. About 10 ml. of citrate solution is added per testicle and extraction is carried out in the cold on a mechanical rotator for approximately one hour. The supernatant liquid is decanted for processing as described below. An equal volume of citrate solution is again added to the testes and the extraction continued for approximately one hour. The testes are extracted for the third time in citrate solution, overnight. The supernatant fluid is again removed for processing.

The supernatant fluids obtained from the three extractions are processed further as they are obtained. The fluid is distributed into 50 ml. conical, sterile, centrifuge tubes and centrifuged at RCF–500 G for 10 minutes, temperature 4° C. The resulting supernatant fluid then is poured into sterile stainless steel centrifuge cups and centrifuged for approximately one hour in the cold at RCF–20,000 G. The supernatant fluid is decanted and discarded. A small quantity of sodium chloride solution then is added to each centrifuge cup and a sterile glass rod is used to dislodge the sediment. The sediments then are poured into a graduated 50 ml. conical centrifuge tube. Sodium chloride solution is added to give a final volume of 2 ml. per testis. Homogenization then is effected by use of a sterile syringe, 5 or 10 ml. capacity, equipped with a 20 gauge needle.

The resulting suspension again is centrifuged in the cold at RCF–500 G for 10 minutes. The supernatant is poured into stainless steel centrifuge cups and centrifuged as before for one hour. The supernatant now is discarded. The sediment is taken up in sodium chloride solution using a sterile glass rod, and transferred to a graduated sterile centrifuge tube. The volume is made up with sodium chloride solution to 0.4 ml. per testis. The suspension is homogenized with a sterile syringe and needle as before. Acetone equivalent to twice the volume of the suspension is measured into a 50 ml. round-bottomed, sterile glass centrifuge tube. The treponemal suspension is poured into the acetone solution, a small amount of sodium chloride solution being used to transfer the slight quantity of suspension remaining in the tube. The acetone extraction is carried out for one hour in the cold with occasional shaking. The material then is centrifuged at RFC–800 G for 15 minutes at 4° C.

The supernatant is discarded and the sediment resuspended in acetone equal in volume to that originally used. The extraction is continued in the cold overnight. The suspension is again centrifuged as before, the supernatant is discarded, and the sediment suspended in a volume of anhydrous ether equal to that of each acetone extraction. The extraction is continued in the cold with occasional shaking for one hour. The sediment is recovered by centrifugation as before, re-extracted in the same volume of ether for one hour, centrifuged, and re-extracted in ether overnight. After the final centrifugation, the tube containing the sediment is stored in a dessicator containing concentrated sulphuric acid. After two days of storage at room temperature in the dark, a spatula is used to break up the dried substance and the resultant white powder is allowed to remain in the dessicator until it is to be extracted in the desoxycholate solution.

The extraction of the serologically active substance is carried out in desoxycholate solution. For every 5 mgms. of dried powder, in a 50 ml. round bottomed glass centrifuge tube, 1 ml. of extracting solution is added. After addition of the required amount of extracting solution, the suspension is homogenized by use of a sterile syringe and needle. The extraction then is continued for one hour in the cold, using a mechanical rotator. The suspension is centrifuged at RFC–800 G for 15 minutes in the cold. The supernatant is removed and saved. One-half of the volume of desoxycholate extracting solution originally used then is added to the sediment which then is homogenized with syringe and needle. The suspension then is centrifuged (without further extraction) as before, and the supernatant is combined with the first supernatant obtained. The combined supernatant is placed in a cellophane sac, the sac is attached to a rotating spindle and dialyzed in the cold against sodium chloride solution for 48 hours (an original and four changes of solution of four liters each has been used for dialysis of extract obtained from 100 mg. of Treponema pallidum powder).

After completion of dialysis, the contents of the sac are placed in Pyrex test tubes, 7 ml. capacity, and centrifuged at RCF–25,000 G in the cold. The supernatant fluid, which contains the active principle, is stored at —20° C. until used.

B. Technique of the complement fixation test

The complement fixation test using desoxycholate extracts of virulent T. pallidum is designated as TPCF. The Kolmer one-fifth volume method is used with the following modifications:

(1) In the titration of the complement, the 1–50 dilution of complement is tested in these amounts: 0.3, 0.25, 0.2, 0.15, 0.1 ml. The results of the complement titration are read after incubation for 30 minutes at 37° C. following the addition of hemolysis and sheep cells. Since the antigen is not anticomplementary, it is not included in the titration. This practice also conserves antigen.

(2) Based on the results of the complement titration, 1.5 units are employed in the test dose instead of 2 units in order to achieve increased sensitivity. (The bulk of this investigation was accomplished with lyophilized complement.) It is recommended that complement yielding titers less than 1–27 not be used. If complement is hyperactive it should not be used at a dilution higher than 1–44.

(3) Sera are heated at 56° C. for 30 minutes, or for 10 minutes if they have been heated on a previous day. For qualitative tests, the test dose of serum is 0.2 ml. of a 1–5 dilution.

C. Other serologic tests (1) Serological tests for syphilis (STS) employing lipoidal or cardiolipin-lecithin antigens usually have been performed in other testing laboratories on the human sera used in the instant study.

(2) Treponemal immobilization tests (TPI) were performed at U.S. Public Health Venereal Disease Experimental Laboratory, in accordance with the method of Nelson and Diesendruck (Nelson, R. A. Jr., and Diesendruck, J. A., J. Immun. 66: 667, 1951) with the modification of Portnoy et al., (Portnoy, J., Harris, A., and Olansky, S., Am. J. Syph., Gonor., and Ven. Dis. 37: 101, 1953), and at the U.S. Public Health Venereal Disease Research Laboratory, in accordance with the procedure of Portnoy et al., cited above.

(3) Agglutination tests were performed at the U.S. Public Health Venereal Disease Experimental Laboratory in accordance with the procedure of McLeod, C. P. and Magnuson, H. J., Public Health Reports 68: 247, 1953.

D. Chemical tests (1) Total phosphorus and nitrogen were determined in the U.S. Public Health Venereal Disease Experimental Laboratory in accordance with the procedures described by Horecker, B. L., Ma, T. S., and Haas, E., J. Biol. Chem. 136: 775 (1940) and Ma, T. S. and Zuazaga, G., Ind. Eng. Chem., Anal. Ed., 14: 280 (1942), respectively.

(2) Total protein was determined by the V.D.R.L. turbidometric method (Manual of Serologic Tests for Syphilis, Supplement No. 22, J. Ven. Dis. Infor., U.S. Public Health Service, 1949) and by the bromsulfalein method of Nayyar (Nayyar, S. N. and Glick, D., J. Histol. and Cytochem., 2: 282, 1954).

(3) Pentose was determined by the original method II described in Kabat and Mayer (Kabat, E. A. and Mayer, M. M., Exper. Immunochem., 1948, C. C. Thomas, Springfield, Ill.).

(4) Glucose and fructose were determined with the anthrone method of Bonting (Bonting, S. L., Arch. Biochem. & Biophys., 52:272, 1954).

E. Source of human specimens

Specimens were obtained from the following sources:

(1) University of North Carolina Memorial Hospital. These represent general hospital admissions and a few prospective blood bank donors.

(2) Reference cases: Collected through the cooperation of various clinics throughout the United States for the purpose of establishing a reserve of sera from carefully documented cases to be used in the evaluation of new procedures.

(3) Venereal Disease Research Laboratory (V.D.R.L.): These represent problem cases submitted by State Laboratories to the V.D.R.L. as part of a TPI service operation.

(4) Public Health Service Hospital, Carville, Louisiana: These represent patients with leprosy with no clinical or historical evidence of syphilis.

II. RESULTS

The antigen extracted from virulent T. pallidum with desoxycholate extracting solution has the following physical properties:

*Appearance.*—Stock solutions containing about 25 mg. percent protein, are opalescent and colorless.

*Effect of heating.*—Stock solutions show a progressive loss in serologic activity when exposed to heat. Thus, solutions heated in a water bath for one hour at temperatures of 56°, 69°, and 100° C. showed loss in activity of approximately 50, 90, and 100 percent, respectively.

*Effect of storage.*—Stock solutions retained their serologic activity when stored at —20° C. for at least two months or at 4° C. for at least two weeks.

III. CHEMICAL CHARACTERISTICS OF DESOXYCHOLATE—EXTRACTED VIRULENT T. *Pallidum*

The results of chemical determination are given in Table I below. Analysis of a single lyophilized extract gave a total phosphorus value of 1.7–2.0 percent, and a nitrogen value of 7.3 percent. Total protein determination on five separate lots of stock antigen extracts gave values ranging from 21–30 mg. percent. Pentose, glucose, and fructose were not detected in the stock antigen extracts.

TABLE I

[Chemical characteristics of desoxycholate-extracted virulent *Treponema Pallidum*.]

| | |
|---|---|
| Phosphorus [1] | 1.7–2.0 percent. |
| Nitrogen [1] | 7.3 percent. |
| Total protein [2] | Range 21–30 mg. percent (5 lots tested). |
| Pentose [2] | Not detected. |
| Glucose [2] | Not detected. |
| Fructose [2] | Not detected. |

[1] Done on lyophilized extract.
[2] Done on stock extracts.

IV. COMPLEMENT FIXATION STUDIES USING DESOXYCHOLATE—EXTRACTED VIRULENT T. *Pallidum*

A. Selection of antigen dose

Antigen extracts were devoid of appreciable anti-complementary effect even when tested in the undiluted state.

The selection of the dose of antigen to be used was made by checkerboard titrations versus dilutions of pools of syphilitic human and rabbit sera. The extent of variation between antigen lots may be seen from the following, which relates the highest dilution of a pool of syphilitic serum, giving complete fixation with a given dilution of antigen extract:

| Antigen Extract | Dilution of Antigen | | |
|---|---|---|---|
| | 1:5 | 1:10 | 1:20 |
| #32 | 1-80 | 1-20 | 1-10 |
| #33* | 1-80 | 1-80 | 1-40 |
| #34 | 1-80 | 1-40 | 1-10 |
| #35* | 1-80 | 1-80 | 1-10 |
| #36 | 1-80 | 1-40 | 1-10 |
| #37 | 1-80 | 1-40 | 1-10 |

*Obtained from cortone-treated rabbits.

Similar reactivity end-points were obtained with all six antigens extracts used at 1–5. (It is of interest that the cortone-treated rabbits yielded more potent antigen extracts than the untreated rabbits.) Since in most of the studies a pool of antigen was used representing at least 3 lots, the 1–5 dilution of antigen extract was employed.

B. Studies related to the specificity and sensitivity of the complement-fixation reaction Although particular care was taken in the harvesting of treponemes from infected rabbits, it seemed likely that testicular substances were recovered along with the treponemes. Therefore, it was necessary to determine whether these tissue extractions contributed to the serologic activity of the antigen. Moreover, it was desirable to determine whether cultured *T. pallidum* (Reiter strain) possessed a similar antigen. To this end, desoxycholate extracts were prepared from the powder obtained by processing normal testes with the method used for treponeme infected rabbits. Similar methods were applied to treponemes (Reiter) grown in a medium with the following composition:

| | Percent |
|---|---|
| Tryptase | 1.5 |
| $NA_2HPO_4$ | 0.7 |
| Yeast extract | 0.5 |
| Glucose | 0.5 |
| Cysteine HCl | 0.1 |
| Horse serum | 8.9 |

As is shown in Table II below, the extract of normal testes were negative with all sera tested even when used as the undiluted stock extract containing protein in a concentration similar to the stock treponeme extracts. The Reiter extract gave positive results with Reiter antiserum (prepared by immunizing rabbits with whole organisms suspended in physiological saline containing 0.25% phenol), but failed to fix complement with all other test sera. Extracts of virulent *T. pallidum* gave positive reactions with syphilitic rabbit and human sera but showed negative findings with Reiter antiserum and the human non-syphilitic pool.

TABLE II

[Results of complement fixation with desoxycholate extracts of virulent *Treponema pallidum*, Reiter Treponemes, and normal rabbit testicles.]

Desoxycholate extracts prepared from—

| Serum | Virulent *T.p.* | Reiter | Normal Testicles |
|---|---|---|---|
| Syphilitic Rabbit Pool, VII B. | Positive 1-160 | Negative | Negative. |
| Reiter Rabbit Antiserum RAS II. | Negative | Positive 1-80 | Do. |
| Human Syphilitic Pool A-G. | Positive 1-40 | Not done | Do. |
| Human Non-Syphilitic Pool. | Negative | do | Do. |
| Rabbits Infected Intracutaneously. | 7 out of 8 positive. | All 8 negative | Not done. |
| Rabbits Infected Intratesticularly. | 20 out of 22 positive. | All 22 negative | Do. |

Absorption experiments were carried out to determine the relationship of the antibody detected by use of desoxycholate extracts to reagin or Wassermann antibody. Since there was a possibility that absorption with lipid antigen might remove flocculating antibody without removing lipid reactive complement fixing antibody, the tests included complement fixation with cardiolipin-lecithin antigen (using VDRL slide antigen).

Table III below shows that treatment of sera with VDRL slide antigen removed the reactivity with this antigen in both flocculation and complement fixation, whereas the capacity to react with *T. pallidum* extract was unchanged.

TABLE III

[Results of VDRL slide flocculation, cardiolipin-lecithin complement fixation, and *Treponema pallidum* complement fixation on sera before and after absorption with VDRL slide antigen.]

| Serum | No. of Absorptions | VDRL Slide | Cardio-Lec. CF | *T. pallidum* CF |
|---|---|---|---|---|
| Human Syph | 0 | 1-20* | 1-80 | 1-40 |
| Pool A-G | 1 | 1-5 | 1-5 | 1-40 |
| Human Syph | 0 | 1-32 | 1-40 | 1-160 |
| Pool E | 4 | Negative | Negative | 1-160 |
| Rabbit Syph | 0 | 1-32 | 1-160 | 1-40 |
| 5074 | 4 | Negative | Negative | 1-40 |

*Highest dilution giving positive reaction.

To determine the relationship of the antibody detected by the TPCF to immobilizing and agglutinating antibodies, inhibition tests were performed. Test sera were incubated with *T. pallidum* extracts and other control solutions at 37° C. for 1 hour followed by overnight incubation in the refrigerator. TPI and agglutination tests then were performed. The results, show that pretreatment with *T. pallidum* extract had no effect on the TPI titer with the VDRL absorbed and unabsorbed serum. A significant reduction in titer of the VDRL absorbed serum, which was permeated with active *T. pallidum* extract, was observed in the agglutination test; however, no change in reactivity was noted with the unabsorbed serum.

V. DISCUSSION

The method herein described for the preparation of an active serological fraction from *T. pallidum* using desoxycholate for the extraction of *T. pallidum* has given satisfactory results with no failures in nine attempts. All antigen lots have been remarkably uniform in serologic behavior as measured by the reactions observed with control sera. An average yield of 2.5–3.0 mg. of dried treponeme powder is obtained from each rabbit. After extraction with desoxycholate, the yield of antigen is sufficient for at least fifty quantitative tests. Antigen extracts retain their serologic activity for at least two months when stored at $-20°$ C.

The Kolmer technique for performing complement fixation tests was adapted to the instant investigation because it is a procedure employed in many laboratories. The one-fifth volume was selected to conserve antigen. The absence of anticomplementary activity of the antigen permitted reduction of complement from 2 to 1.5 hemolytic units, achieving greater sensitivity without loss of specificity.

With regard to the reproducibility of the TPCF, consistent end-points of reactivity of the positive control serum have been obtained and excellent agreement on repeat testing of individual sera has been noted. All antigen extracts have shown fairly consistent total protein content associated with essentially similar serologic behavior. This, plus the destruction of serologic activity by exposure to heat, is indicative of a protein nature of the antigen. The significance of the total phosphorus content of the antigen is not clear at this time, but in this connection it may be noted that analyses of stock extracts of *T. pallidum* and normal testes at similar protein concentrations have shown that the latter contains 1.5 times as much phosphorus as the former.

Apparently the reactive substance of *T. pallidum* extracts is present neither in Reiter organisms nor in normal testicles, although an antigen active against Reiter antiserum can be prepared from Reiter organisms by the present technique.

The relationship of TPCF antibody to other previously recognized antibodies occurring in syphilis is suggested by various lines of experimentation. The absorption of test sera with cardiolecithin antigen clearly shows separate identities of reagin and TPCF antibodies. However, an antiserum produced by the injection of rabbits with floccules obtained by the interaction of VDRL slide antigen and syphilitic human serum was found to be non-reactive with TPCF, although reactive with the VDRL slide test to a dilution of 1–64. That TPI and TPCF antibodies are not identical is indicated by the results obtained in the inhibition tests. The possible relationship of TPCF to non-reagin-like agglutinating antibody is indicated by the inhibition tests, since inhibition is observed only with the VDRL absorbed serum, pretreated with active desoxycholate antigen.

Differences between TPCF antibody and TPI antibody are further indicated by the results obtained in experimental syphilis in rabbits. It was found that the TPCF antibody appeared very early in disease, as did reagin. Although a possible explanation for such a difference might be variations in sensitivity of the two procedures (TPI and TPCF) this is unlikely in view of the lower incidence of reactions in TPCF in latent and late human syphilis as compared to TPI. Further, the effect of heating at varying temperatures indicates a differing susceptibility of TPI, TPCF, and reagin antibodies.

To obtain information on the specificity of the TPCF test, sera from general hospital admissions representing a great variety of disease entities have been examined. On the basis of negative STS, 98% of 383 cases were negative in the TPCF. Of the 8 cases, negative with STS and reactive with TPCF, four were reactive with TPI. It is of interest that three of the latter cases were prospective blood bank donors and would not have been suspected of syphilis on the basis of conventional STS.

Additional information bearing on the specificity of the TPCF test as well as its ability to detect antibodies in syphilis (sensitivity) was obtained through the study of cases with careful clinical documentation. In the biologic false positive group (49 cases) and the leprosy group (12 cases) the TPCF showed 92% agreement with the TPI, indicating a high specificity for the TPCF. In primary and secondary syphilis, the TPCF and STS showed equal percentages of reactivity, whereas the TPI gave a lower incidence of reactions as compared with both TPI and STS. The early appearance of TPCF antibody in human disease is in agreement with the preliminary data on rabbit experimental syphilis reported herein. The significance of the lower incidence of positive reactions in latent and late syphilis with TPCF is not yet known.

VI. SUMMARY

A. From the foregoing description, it will be seen that the present invention provides a process for preparing a serologically active chemical fraction of virulent *Treponema pallidum* (the causative agent of syphilis). The active chemical fraction has been identified tentatively as a complex protein.

B. The process involves the isolation of virulent *Treponemum pallidum* from infected rabbit testicles; treatment of the isolated organisms with acetone and with ether to remove non-specific substances to yield a dry powder; the extraction of a known weight of dried treponemal powder with a given amount of extracting solution containing sodium desoxycholate, sodium chloride, and sodium citrate, and dialysis of the extract obtained to give rise to the active chemical fraction.

C. The chemical fraction obtained by the process described has unique serologic properties. When employed in a simple complement fixation test, this chemical fraction appears to detect a new type of antibody present in syphilitic disease. Whereas other serologic procedures which have used whole virulent *Treponema pallidum* are extremely difficult to perform, thus limiting their usefulness, the chemical fraction obtained by the process described is used in a simple, easy to perform complement fixation test. The high order of specificity and sensitivity attained by use of this chemical fraction in a complement fixation test and the simplicity of the test are indicative of potential usefulness in the serodiagnosis of syphilis and in the differentiation of biologic false positive reactions.

While the foregoing description sets forth the process of the present invention in specific detail as actually practiced in the preferred manner, it will be apparent that specific procedural details thereof may be varied to accommodate the procedure to different circumstances, as will become apparent to one skilled in the art without departing from the inventive concept, and accordingly it will be understood that it is intended and desired to embrace within the scope of this invention such modifications and changes as may be necessary or desirable to adapt it to varying conditions and uses as defined by the scope of the appended claims.

Having thus described my invention, what I claim as new and wish to secure by Letters Patent is:

1. In a process for preparing a serologically active chemical fraction of virulent *Treponema pallidum* by isolating virulent *Treponema pallidum* organisms from infected rabbit testicles, and treating the isolated organisms with acetone and with ether to remove non-specific substances and to yield a dry treponemal powder, the improvements which comprise extracting a known weight of the dried treponemal powder with a known amount of extracting solution containing essentially sodium desoxycholate, sodium chloride, and sodium citrate, and dialyzing the resulting extract against sodium chloride solution for obtaining the active chemical fraction.

2. A serologically active chemical fraction of virulent *Treponema pallidum* obtained from virulent *Treponema pallidum* organisms obtained by the method of claim 1, the fraction being a complex protein usable in complement fixation tests for syphilis.

3. In the preparation of a serologically active chemical fraction of virulent *Treponema pallidum*, the steps of extracting a treponemal material obtained by extracting with acetone and with ether rabbit testicles infected with virulent *Treponema pallidum* organisms with an aqueous solution of sodium salts including sodium desoxycholate as principal extractant, together with small amounts of sodium chloride and sodium citrate, and dialyzing the resulting extract against an aqueous sodium chloride solution to obtain the desired fraction adapted for use in diagnostic complement fixation reactions for syphilis.

4. A serologically active fraction of virulent *Treponema pallidum* obtained by the method of claim 3.

5. The process claimed in claim 3, wherein the aqueous extracting solution of sodium salts contains sodium desoxycholate 0.2%; sodium citrate 0.1 M; and sodium chloride 0.1 M; the sodium salts being dissolved in distilled water, heated to boiling, boiled for substantially two minutes and stored in a sterile glass-stoppered flask at room temperature, the resulting solution having a pH value of from substantially pH 7.4 to pH 7.5.

References Cited in the file of this patent

UNITED STATES PATENTS

| | | |
|---|---|---|
| 2,334,636 | Mazzini | Nov. 16, 1943 |
| 2,709,670 | Ichelson | May 31, 1955 |

OTHER REFERENCES

Am. J. Clinical Pathology, 26:3, March 1956, pp. 313–322.

Am. J. of Public Health, 46:2, February 1956, pp. 190–194.

J. Immunology, vol. 75, November 1955, pp. 348–355.

Cohen: J. Inv. Derm., November 1956, pp. 369–376.

Kline: Am. J. Clin. Pathology, March 1948, pp. 185–192.

Harm: J. Inv. Derm., November 1956, pp. 369–376.

Kabat: Exptl. Immunochem., pub. 1948, p. 17.

Boyd: Fundamentals of Immuno., pub. 1947, pp. 294 and 295.